Jan. 7, 1936.  R. F. PESCOD ET AL  2,026,702

COAL CUTTING MACHINE

Filed Sept. 10, 1935  4 Sheets-Sheet 2

Jan. 7, 1936.  R. F. PESCOD ET AL  2,026,702
COAL CUTTING MACHINE
Filed Sept. 10, 1935  4 Sheets-Sheet 3

Jan. 7, 1936.  R. F. PESCOD ET AL  2,026,702
COAL CUTTING MACHINE
Filed Sept. 10, 1935   4 Sheets-Sheet 4

Patented Jan. 7, 1936

2,026,702

UNITED STATES PATENT OFFICE 2,026,702

COAL-CUTTING MACHINE

Richard Franklin Pescod and Henry Reginald Hornsby, Birtley, and George William Newell Harrison, Low Fell, England, assignors to Anderson, Boyes & Company Limited, Motherwell, Lanarkshire, Scotland, a company of Great Britain Application September 10, 1935, Serial No. 39,984
In Great Britain February 28, 1934

3 Claims. (Cl. 262—30)

This invention relates to coal-cutting machines, viz., chain-cutter machines, more particularly to a machine of the type in which provision is made for preventing the return to the cut of cuttings accumulating at the rear of the cutter, and in which there is incorporated at the cutting end a cutting-sweeping device comprising a bladed impeller deriving rotation from the machine motor and so arranged that its blades enter the zone in which the cuttings tend to accumulate and convey such cuttings from the zone of accumulation to a zone external to the path of the cutter-chain.

In the operation of a coal-cutting machine, there is produced in the wake of the machinery a parapet of cuttings which may be nearly as high as the machine itself. A machine fitted with an impeller rotatable about a vertical axis is not only liable to be immersed in the parapet but also is liable, by itself, to return the cuttings which lie in its path.

The object of the present invention is to provide in coal-cutting machines a cutting-sweeping device which is capable of throwing the cuttings as high as or higher than the top of the parapet, so that the cuttings thrown by the device will proceed along the top of the parapet and away from the cut.

With this object in view, the invention provides a coal-cutting machine incorporating an impeller constituted by a plurality of blades which are mounted on a chain confined to move in an elliptical path which is disposed obliquely of the axis of the cutter-chain driving sprocket, so that the blades descend as they enter the zone of accumulation and ascend as they leave such zone, whereby the cuttings are thrown forcibly upwards along the parapet of cuttings which lies in the wake of the machine and parallel with the line of cut. Conveniently, the chain which carries the blades is driven by a sprocket mounted on a shaft which derives rotation through the intermediary of gearing, from the shaft which drives the cutter-chain driving-sprocket.

Figure 1:
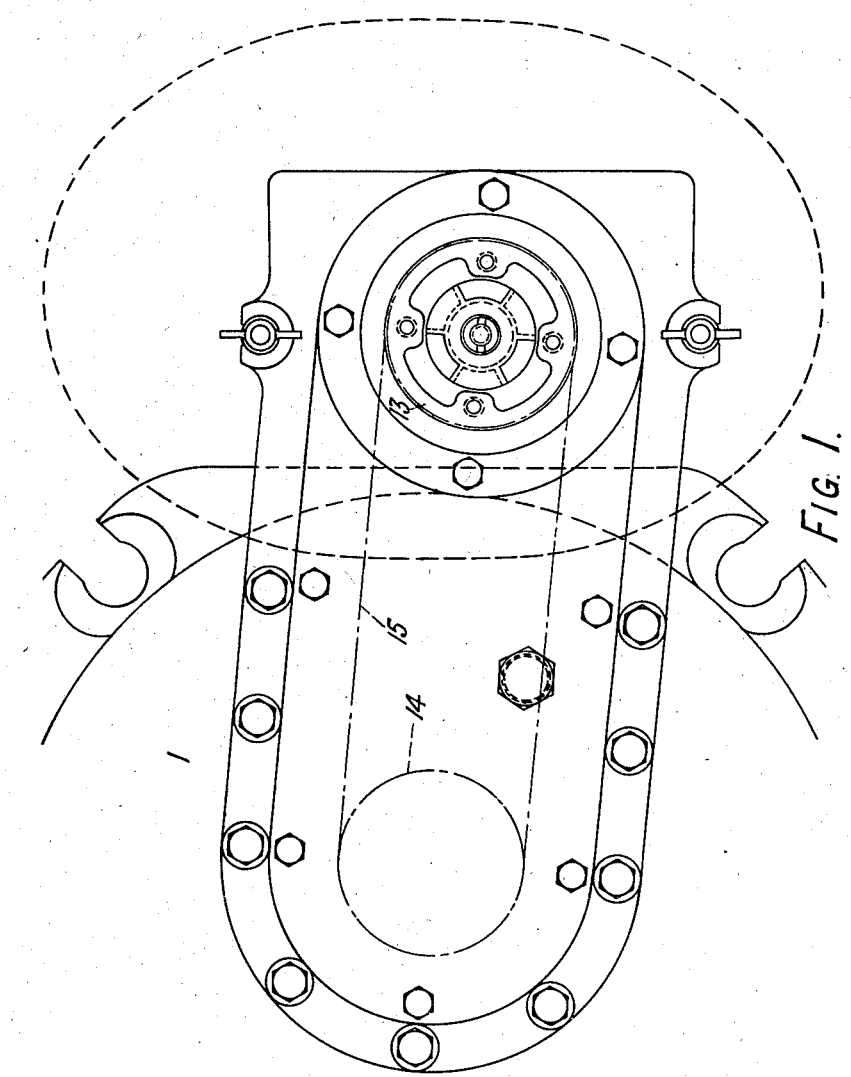
Figure 2:
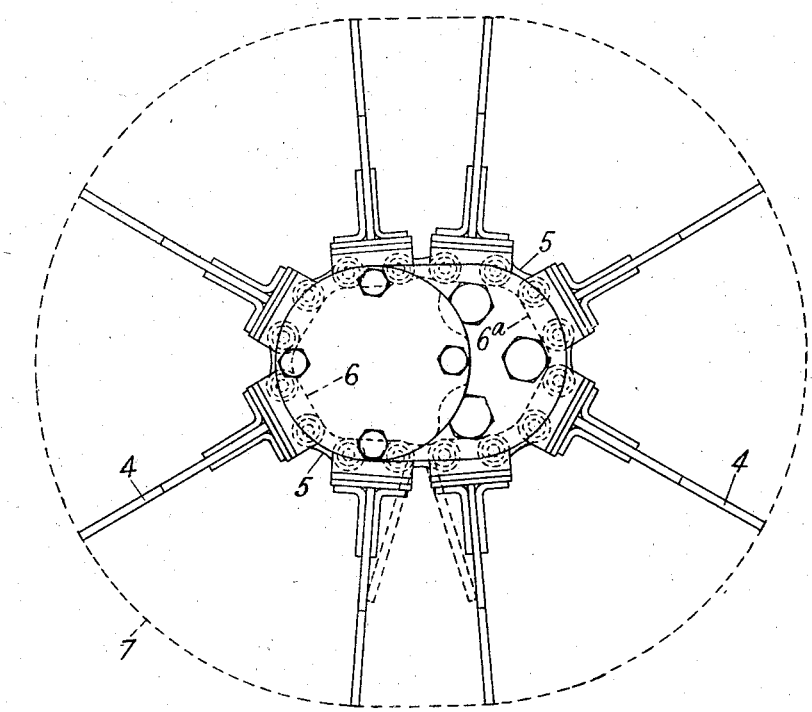
Figure 5:
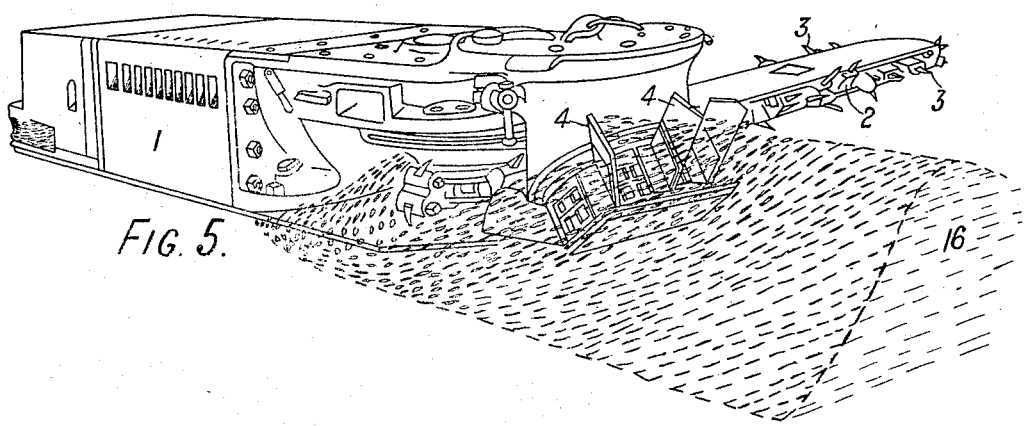
Figure 3:
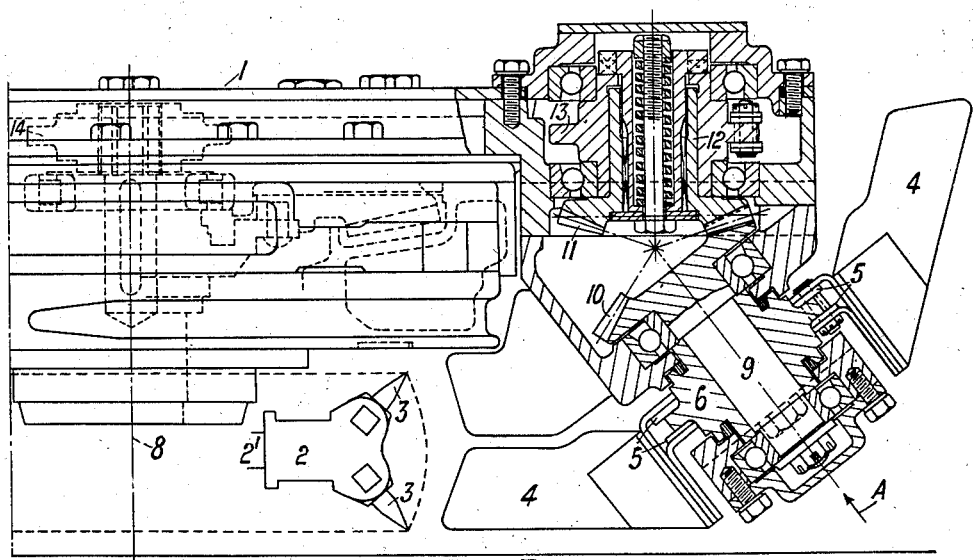
Figure 4:
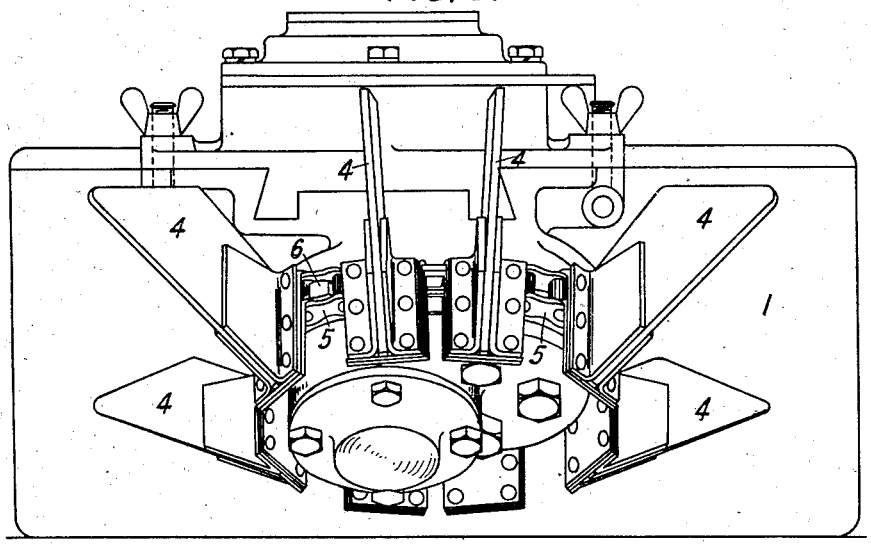

A coal-cutting machine according to the invention is illustrated in the accompanying drawings in which Fig. 1 is a plan, Fig. 2 a fragmentary inverted plan viewed in the direction of the arrow A in Fig. 3, Fig. 3 a side elevation showing certain details in section and Fig. 4 an end elevation. Fig. 5 is a perspective view and Fig. 6 a diagrammatic plan view showing the machine in operation.

Figure 6:
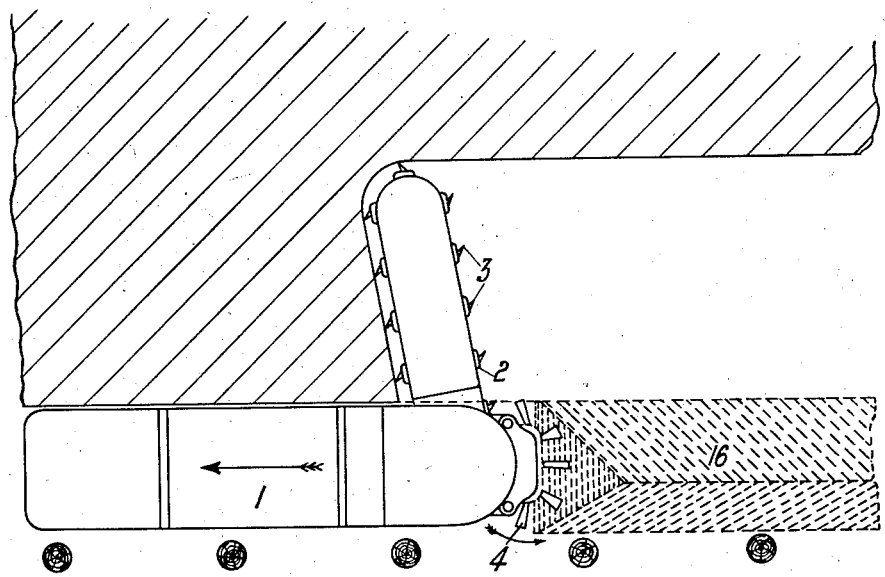

Referring to the drawing, 1 denotes generally the coal-cutting machine and 2 the cutter-chain including a pick-holder carrying picks 3. Incorporated in the cutting end of the machine is a cutting-sweeping device comprising a bladed impeller deriving rotation from the machine motor and so arranged that its blades enter the zone in which the cuttings tend to accumulate, i. e., the zone to the right of the picks 3 in Fig. 3 and throw such cuttings from the zone of accumulation along the parapet 16 of cuttings disposed parallel to the line of cut into a zone external to the path of the cutter-chain, as shown in Figs. 5 and 6. The impeller is shown as constituted by a plurality of blades 4 which are mounted on a chain 5 guided by sprockets 6, 6ᵃ to move in an elliptical path indicated by the dotted line 7 in Fig. 2 which is disposed obliquely of the axis (indicated at 8 in Fig. 3) of the cutter-chain driving-sprocket 2', so that the blades 4 descend as they enter the zone of accumulation and ascend as they leave such zone, whereby the cuttings are thrown upwardly. The sprocket 6 which is the driving sprocket is mounted on a shaft 9 deriving rotation, through the intermediary of gearing, from the shaft which drives the cutter-chain driving sprocket 2'. The gearing shown includes bevel wheels 10, 11 a shaft 12, sprockets 13, 14 and a chain 15.

The impeller is rotated in the same direction as the direction of circulation of the cutter-chain.

We claim:

1. The combination with a coal-cutting machine of the chain-cutter type having a cutter-chain driving-sprocket of a cutting-sweeping device comprising an impeller constituted by a plurality of blades and a blade-carrying chain confined to move in an elliptical path which is disposed obliquely of the axis of the cutter-chain driving-sprocket, so that the blades descend as they enter the zone of accumulation of the cuttings and ascend as they leave said zone to throw the cuttings forcibly upon and along the parapet of cuttings disposed in the wake of said machine and parallel with the line of cut.

2. The combination claimed in claim 1 in which the blade-carrying chain is driven by a sprocket mounted on a shaft which derives rotation, through the intermediary of gearing, from the shaft which drives the cutter-chain driving-sprocket.

3. The combination claimed in claim 1 in which the impeller is rotated in the same direction as the direction of circulation of the cutter-chain.

RICHARD FRANKLIN PESCOD.
HENRY REGINALD HORNSBY.
GEORGE WILLIAM NEWELL HARRISON.